James Daviss Collett
Joseph Alfred Walston III
INVENTORS
BY Murray Robinson
ATTORNEY May 31, 1960 J. D. COLLETT ET AL 2,938,964

RECORDING APPARATUS

Filed March 13, 1957 3 Sheets-Sheet 2

James Daviss Collett
Joseph Alfred Walston III
INVENTORS

BY Murray Robinson

ATTORNEY

May 31, 1960 J. D. COLLETT ET AL 2,938,964

RECORDING APPARATUS

Filed March 13, 1957 3 Sheets-Sheet 3

James Daviss Collett
Joseph Alfred Walston III
INVENTORS

BY Murray Robinson

ATTORNEY

United States Patent Office
2,938,964
Patented May 31, 1960

2,938,964

RECORDING APPARATUS

James Daviss Collett and Joseph Alfred Walston III, Houston, Tex., assignors to Associated Engineering & Equipment Company, Inc., Houston, Tex., a corporation of Texas Filed Mar. 13, 1957, Ser. No. 645,772
5 Claims. (Cl. 179—100.2)

This invention pertains to recording apparatus.

The general object of the invention is to provide an apparatus for making a record of the incidence of sounds, lights, and other signals and physical manifestations. The apparatus to be described is particularly adapted for making a record of the operation of the warning signals, e.g. light and foghorn, placed on a navigational hazard such as an offshore oil well. The record may be used as proof of proper functioning of the signals to assist in fixing responsibility in case of collision, and also to warn the user in case of faulty operation of the signals so that they can be repaired to avoid any collision.

More particular objects are to provide such an apparatus which will operate reliably and over long periods of time without the attendance of an operator or serviceman. Reliability is essential if the apparatus is to provide acceptable proof. Long term operation without attention is requisite if the apparatus is to be used at inaccessible locations. A very important object of the invention is to provide such an apparatus which is economical to manufacture and easy to service.

Other objects and advantages of the invention will appear from the following description of a preferred embodiment thereof wherein.

Figure 1:
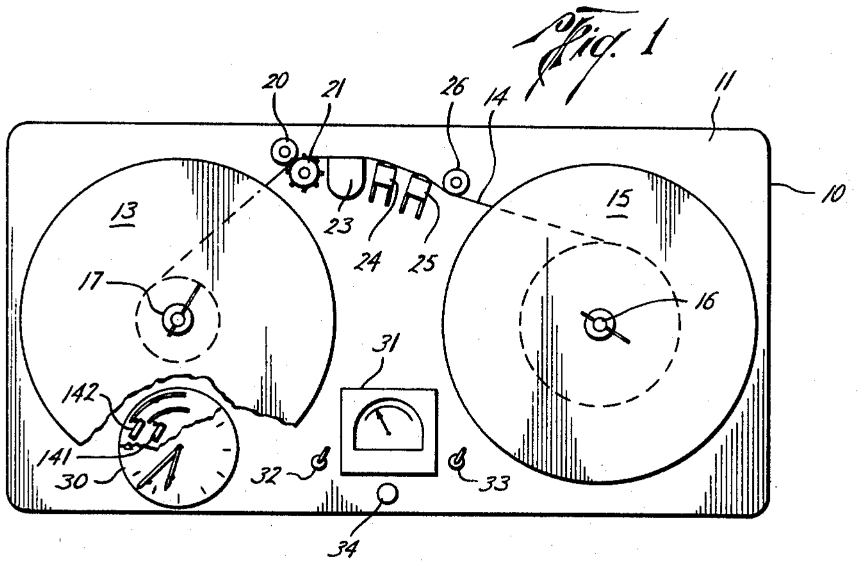
Figure 1 is a top plan view of an apparatus embodying the invention.

Referring now to Figure 1, there is shown an aluminum case 10 within which the recording equipment is disposed. A panel 11 is disposed across the upper end of the case. A cover, not shown, is hinged to the back edge of the case to close over equipment disposed on top of the panel.

On top of the panel is disposed a supply reel 13 from which magnetic recording tape 14 unwinds onto storage reel 15. Reel 15 is driven by shaft 16 from a spring motor to be described later. Reel 13 is mounted on shaft 17 which is freely rotatable in its bearings. As tape 14 unwinds from reel 13, it passes under guide roll 20 and over sprocket 21 which engages with perforations 22 (see also Figure 3) along the sides of the tape. Rotation of sprocket 21 is controlled by an escapement as will be described hereinafter. After passing over sprocket 21 in the particular apparatus shown, the tape slides over permanent magnet 23 which removes any record previously on the tape. However the magnet 23 may be omitted for if a tape with a previous record on it should happen to be used, the overlapping of the later record would be apparent. Then the tape moves over two magnetic recording heads 24, 25 and under guide roll 26 to storage reel 15. Any number of recording heads may be used and the heads may have any number of recording channels.

Also disposed on panel 11 are clock 30 periodically actuating switches to impress a time signal on the magnetic tape, a meter 31 used to adjust the amplifications of the signals to be recorded, and a plurality of snap switches 32, 33, and a rheostat 34 whose purpose will be described later.

Figure 2:
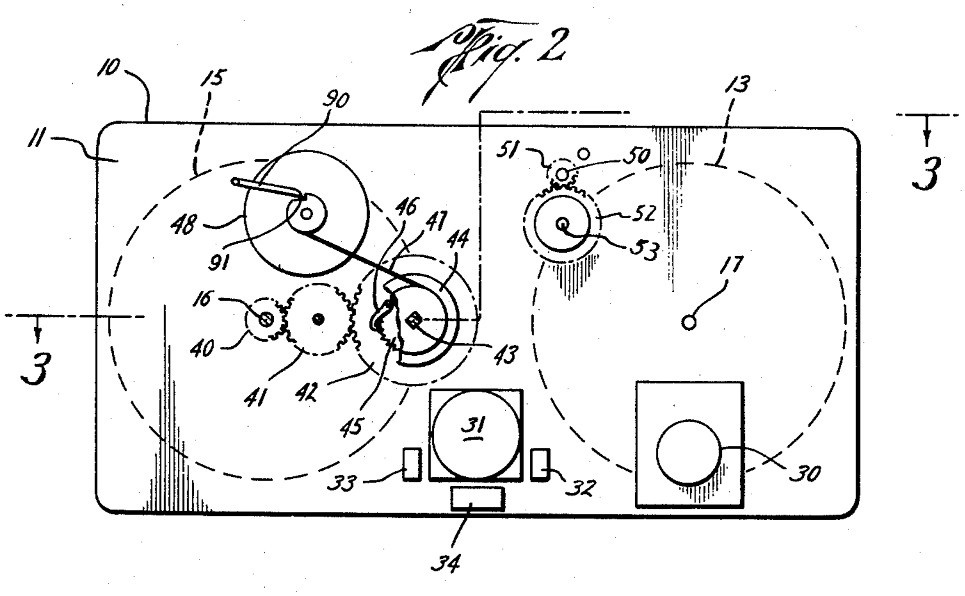
Figure 2 is a view looking at the bottom of the apparatus shown in Figure 1.
Figures 3, 3A, 4:
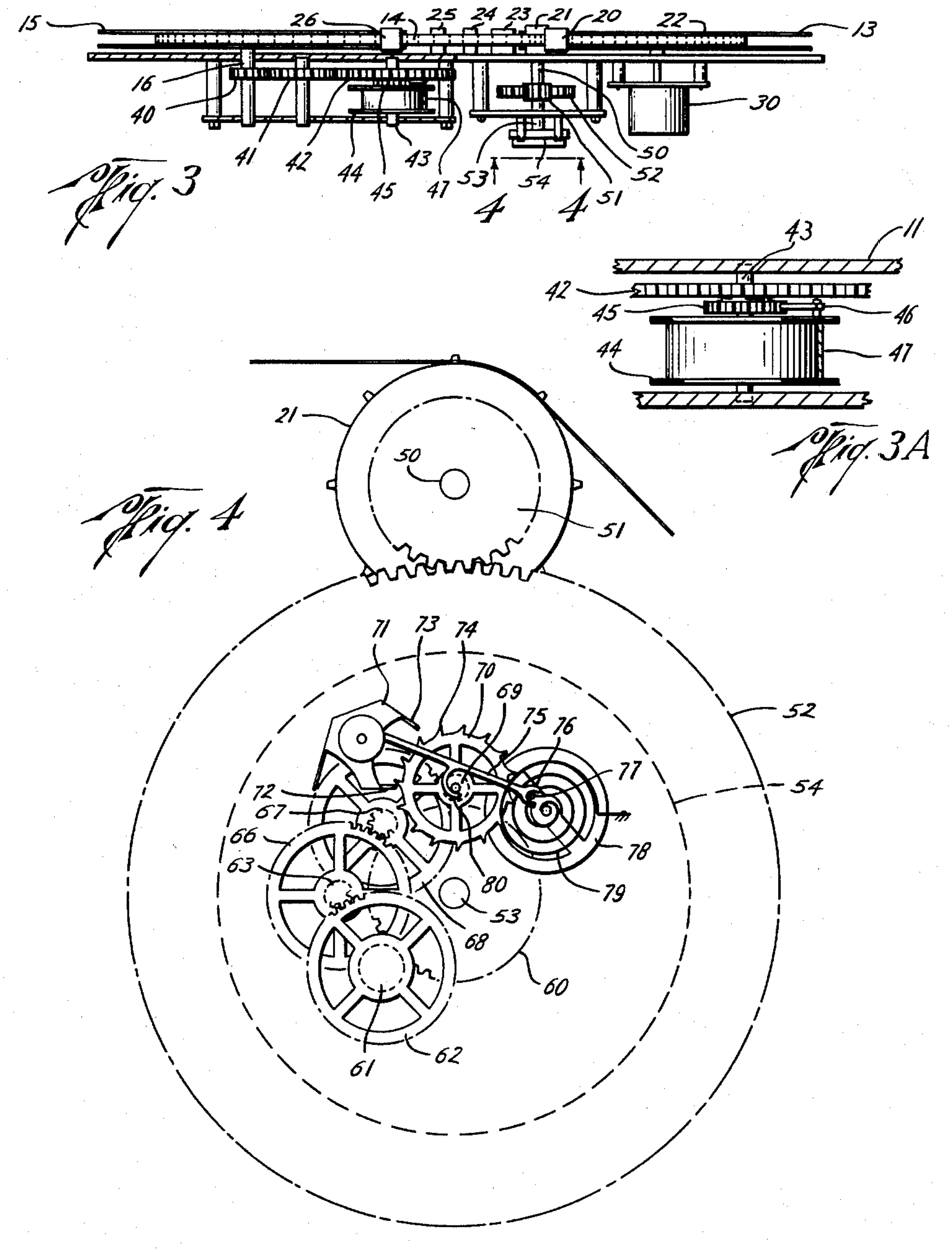
Figure 3 is a section taken on line 3—3 of Figure 2.
Figure 3A is an enlarged view of a portion of Figure 3.
Figure 4 is a view on line 4—4 of Figure 3 showing, to a larger scale, the detail of the escapement.

Referring now to Figure 2, there is shown the apparatus on the underside of panel 11, the tape reels 13 and 15 being shown in dotted outline. Pinion 40 is fastened to shaft 16 of storage reel 15 and is driven by idler gear 41 from gear 42. Referring also to Figures 3 and 3A, gear 42 is rotatably mounted on shaft 43 on which is secured supply drum 44 of the spring motor. A ratchet wheel 45 is secured to the side of and drives gear 42. Ratchet wheel 45 is driven by a pawl 46 pivotally secured to the side of drum 44. A spring tape 47 having a natural curvature in the counterclockwise direction progressing from the inside out is secured at one end to the core of supply drum 44 and is reversely wound thereon. Spring tape 47 tends to unwind from drum 44 onto freely rotatable storage drum 48 where it winds according to its natural curvature. The coils of the spring tape on both drums are tight, that is, without any space between layers. This type of spring motor produces a substantially constant torque, especially if the radius of natural curvature of the spring is varied throughout the length of the outermost layer of spring tape on each drum as the tape unwinds and winds.

As best shown in Figure 3, sprocket 21 is secured to shaft 50 on which is fastened a pinion 51 in engagement with gear 52 fixedly mounted on shaft 53. An escapement 54 controls rotation of shaft 53. As shown in Figure 4, the escapement includes a gear 60 secured to shaft 53 and engaging a pinion 61 which is secured to the shaft on which gear 62 is affixed. Gear 62 engages pinion 63 secured to a shaft on which gear 66 is fastened. Gear 66 engages pinion 67 which is fastened to a shaft on which is affixed gear 68 Gear 68 engages a pinion 69 secured to a shaft on which ratchet wheel 70 is fastened. Rotation of ratchet wheel 70 is controlled by the double pawl 71 whose stops 72, 73 alternately engage the teeth 74 of the ratchet wheel as the lever 75 secured at one end to pawl 71 is oscillated back and forth. Lever 75 has a fork 76 at its opposite end which is in engagement with a pin 77 carried by balance wheel 78 which is pivotally mounted in the housing of the escapement. A spiral spring 79 is fastened at one end to the shaft of balance wheel 78 and at the other end to the escapement housing, the latter connection being azimuthally adjustable about the axis of the balance wheel. The travel of lever 75 is limited by stop 80 extending from one side thereof.

The rate at which shaft 50 can turn is thus dependent on the frequency of oscillation of balance wheel 78 of the escapement 54. Since sprocket 21 is connected to shaft 50, the rate of travel of tape 14 in response to the pull of storage drum 15 is thereby limited.

In operation, the spring tape 47 is wound on drum 44 by turning shaft 43, e.g. manually by means of a crank (not shown) which can be connected to shaft 43. Shaft 43 is free to turn clockwise (as viewed in Figure 2) and the engagement of the pawl 46 carried by drum 44 with ratchet wheel 45 on gear 42 prevents any retrograde motion except under the control of the escapement. When the tape is all wound on drum 44, a pawl 90 pivotally mounted on the panel 11 drops into recess 91 in the case of drum 48 where the end of tape 47 is secured to prevent overwinding of the spring motor. The spring tape 47 then unwinds slowly from drum 44 onto drum 48 driving gear 42 through pawl 46 and ratchet 45. Gear 42 through the gear train previously described causes storage reel 15 to turn and wind up the magnetic tape from supply reel 13. With a 75 foot spring tape a magnetic tape 500 feet long can be driven at a rate of 16 feet per day to provide a continuously fresh record medium for as long as a month. This unusually long period of unattended operation of a spring driven mechanism is a principal feature of the invention, made possible in large part by the special type of spring drive employed. The indirect governing of the speed of the spring motor by means of an escapement connected not to the motor but to the magnetic tape wound on the reel driven by the motor is another feature of the invention which has the advantage of giving a greater liberty of selection in the physical positions of the parts within the case, making for simplicity and economy in manufacture and easy access for repair and replacement of parts. The overall result is a lightweight portable instrument of great reliability.

Figure 5:
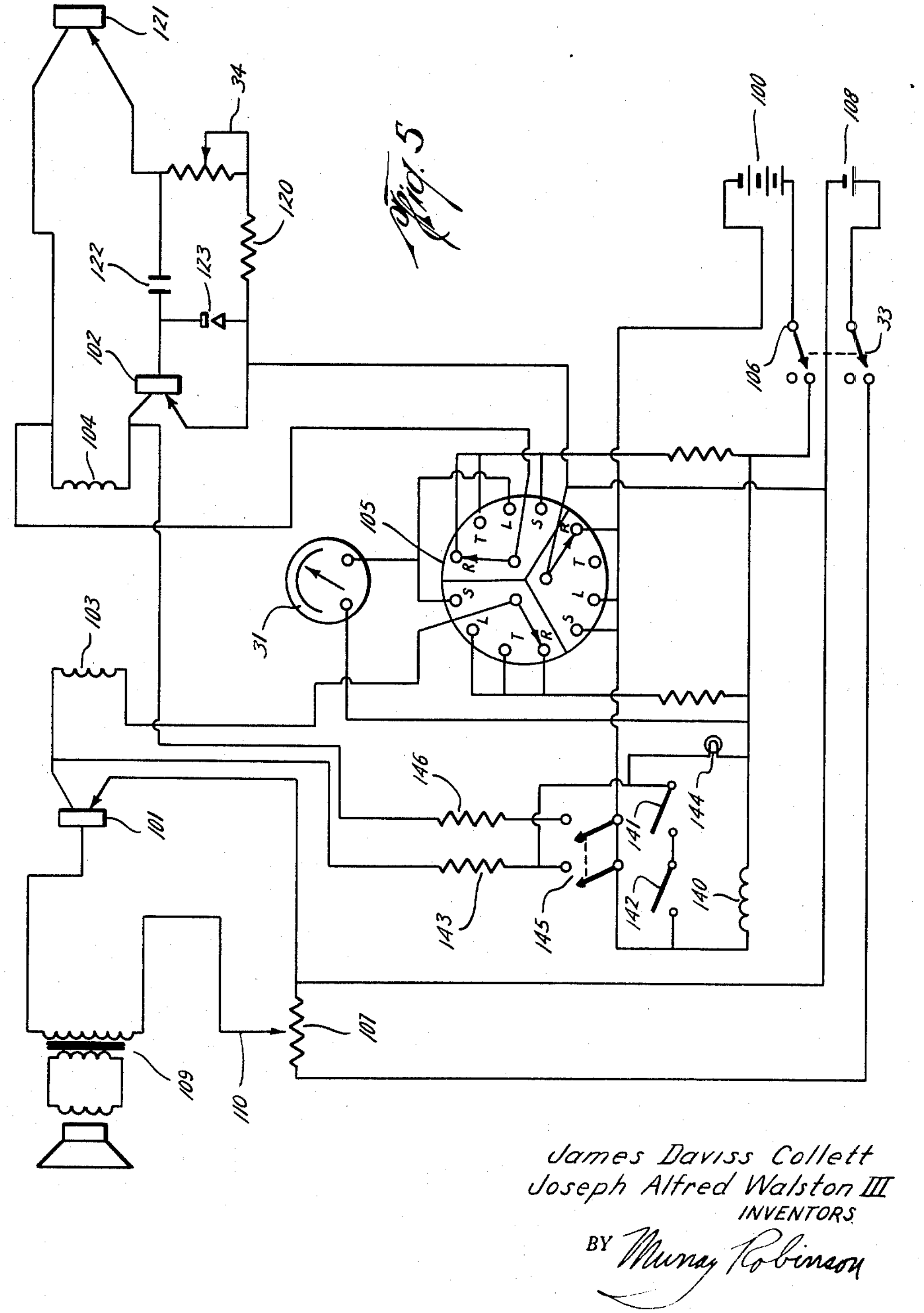
Figure 5 is a wiring diagram of the apparatus shown in Figure 1 together with the equipment with which it is associated in use.

Referring now to Figure 5 there is shown the electric circuit of the recorder and associated apparatus. A battery 100 supplies power through the emitter collector circuits of transistors 101, 102 respectively, to coils 103, 104 of the aforementioned magnetic recording heads 24, 25. The circuit starts from battery 100 and extends through one pole of three pole selector switch 105 from which it branches to the transistors 101, 102 and coils 103, 104, returning through the other two poles of switch 105 and after going through two resistors merges and is completed through one side 106 of on-off switch 33. The emitter base circuit of transistor 101 is biased by potentiometer 107 which is connected in series with battery 108 through the other side 108 of on-off switch 33. Tap 110 from potentiometer 107 is in circuit with the output of microphone 109 which is disposed to receive sound signals, e.g. foghorn blasts, from the navigational hazard. The sensitivity of transistor 101 is adjusted by varying the position of tap 110. For large input from the microphone 109, the bias voltage can be omitted entirely.

Input power for transistor 102 is supplied from battery 100 through resistance 120, the rheostat 34 (previously referred to with reference to Figure 1), in series with which is to be connected photo-sensitive transistor 121 disposed to receive light signals, e.g. flashes of a beacon light, from the navigational hazard. A capacitor 122 limits the amount of direct current that can flow to transistor 102 and contact rectifier 123 allows the charge to leak off capacitor 122 to prevent it from blocking transistor 102. The sensitivity of the circuit to light signals is adjusted by means of rheostat 34.

In order to adjust the sensitivity of the apparatus to the actual sound and light signals encountered, switch 105 is turned from the R or record position shown. To adjust the light signal sensitivity, switch 105 is turned to the L position which places ammeter 31 in series with coil 104 so that the current amplitude can be measured and adjusted to the desired magnitude. By turning switch 105 to the S position, sound recorder coil 103 is placed in series with meter 31 so that the sensitivity of the sound reception part of the recorder can be adjusted.

In order to apply a periodic time signal to the recording tape, the power coil 140 of the aforementioned electric clock 30 is connected to battery 100. Once every revolution the hour hand of the clock closes switch 141 and once every revolution the minute hand closes switch 142. When both switches are closed, as occurs precisely every 12 hours, a circuit from coil 103 of the sound recording head through resistance 143 and switches 141, 142, is completed back to the battery 100 thereby applying a steady strong current to the sound recording head which saturates the iron in the magnetic tape so that all effect of the sound signal is lost in the background and there is an easily distinguishable time signal on the record tape. Whenever this automatic time signal is applied the indicator light 144 flashes to give a visual indication of the signal to any attendant who may be servicing the equipment.

Whenever it is desired to impress a time signal manually, e.g. at the start of operation of the device, switch 105 is turned to the T position disconnecting the transistors 101, 102 from battery 100 so that there is no signal applied from them to the coils 103, 104. The double pole switch 145 can be closed which connects both the sound and light coils 103, 104 to battery 100 through resistances 143 and 146 respectively, thereby making a record on both the sound and light tracks of the magnetic tape, such a record being thereby distinguished from the automatic signal.

In operation, after the sensitivity of the sound and light signal recording portions of the apparatus have been adjusted as previously described, the switch 105 is turned to the R or record position and switch 33 closed, switch 145 being open. Then as the spring motor pulls the magnetic tape 14 over the recording heads 24, 25, records are made thereon of the light and sound signals received by the recorder. The records transcribed by the recording heads occupy separate parallel tracks on the magnetic tape so as to be clearly distinguishable. Periodically (every 12 hours), the clock controlled switches close and a strong time signal is imposed on the sound track of the tape. Whenever a tape is changed a manual time signal may be imposed, first at the end of the old tape and then at the beginning of the new tape. In this way the entire record is accurately correlated as to time. Since the tape first passes over permanent magnet erasing head 23, before passing over the recording heads 24, 25, it is assured that the record on the tape is a fresh record even if by mistake a tape with its previous record still on it should be placed in the apparatus.

In using the recorder it is only necessary for a service man to visit the apparatus periodically, e.g. once a month, to replace the magnetic tape, rewind the spring motor, and if necessary, replace the batteries. The magnetic tape is taken back to a laboratory where its record can be made visible by passing it through colloidal iron and a fixative, or it can be reproduced on a photographic or paper and ink or other record form by passing it through a transducer and the tape can be cleared of its record and sent out again for reuse.

While a preferred embodiment of the invention has been illustrated and described, many modifications thereof can be made by one skilled in the art without departing from the spirit of the invention and it is desired to protect by Letters Patent all forms of the invention falling within the scope of the following claims.

We claim:

1. Recording apparatus comprising supply and storage reels, a perforated magnetic tape wound on said reels and extending therebetween, a recording head disposed adjacent the path of travel of said magnetic tape between said reels, a rotatable sprocket engaging said magnetic tape at a portion thereof between said reels, an escapement operatively coupled to said sprocket for regulating its speed of rotation, supply and storage drums, a spring tape wound on said supply and storage drums and extending therebetween, and means operatively connecting said supply drum to said storage reel for rotation together in response to winding of said spring tape from said supply drum to said storage drum.

2. Recording apparatus comprising supply and storage reels, a magnetic tape wound on said reels and extending therebetween, supply and storage drums, a spring tape wound on said drums and extending therebetween, said spring tape having a natural curvature about an axis parallel to its width and being reversely wound on said supply drum and wound in its natural direction of curvature on said storage drum, means operatively coupling said supply drum to said storage reel for rotation together in response to winding of said spring tape on said storage drum, means regulating the speed of travel of said magnetic tape as said spring tape winds on said storage drum, a pair of means for transcribing separate parallel records on said magnetic tape as it passes from the supply reel to the storage reel, one of said said means including a sound responsive device and the other including a light responsive device.

3. Recording apparatus comprising supply and storage reels, a magnetic tape wound on said reels and extending therebetween, supply and storage drums, a spring tape wound on said drums and extending from one to the other, means to drive the system comprising said reels and magnetic tape from the system comprising said drums and spring tape, means to govern the speed of said drive to maintain said speed constant, a pair of means for transcribing separate parallel records on said magnetic tape, one of said means including a sound responsive device and the other including a light responsive device, and time controlled means for periodically applying to one of said transcribing means a signal of constant magnitude sufficient to saturate said magnetic tape.

4. Recording apparatus comprising supply and storage reels, a magnetic tape wound on said reels and extending therebetween, supply and storage drums, a spring tape wound on said drums and extending from one to the other, means to drive the system comprising said reels and magnetic tape from the system comprising said drums and spring tape, means to govern the speed of said drive to maintain said speed constant, a pair of means for transcribing separate parallel records on said magnetic tape, one of said means including a sound responsive device and the other including a light responsive device, and manual means for disconnecting both said devices from said pair of means and impressing on said pair of means a predetermined electric signal to transcribe on said magnetic tape a distinguishable record corresponding in position thereon to the time of actuation of said manual means.

5. Recording apparatus comprising supply and storage reels, a magnetic tape wound on said reels and extending therebetween, supply and storage drums, a spring tape wound on said drums and extending from one to the other, means to drive the system comprising said reels and magnetic tape from the system comprising said drums and spring tape, means to govern the speed of said drive to maintain said speed constant, a pair of means for transcribing separate parallel records on said magnetic tape, one of said means including a sound responsive device and the other including a light responsive device, each of said means further including an amplifier and means for adjusting the sensitivity thereof, and means selectively to introduce a meter into either of said pair of means to measure the intensity of the recording output thereof while adjusting the sensitivity of the corresponding amplifier.

References Cited in the file of this patent

UNITED STATES PATENTS

| | | |
|---|---|---|
| 2,063,799 | Fornelius et al. | Dec. 8, 1936 |
| 2,291,476 | Kernkamp | July 28, 1942 |
| 2,622,476 | Ress | Dec. 23, 1952 |
| 2,653,190 | Godeck | Sept. 22, 1953 |
| 2,677,727 | Haynes | May 4, 1954 |
| 2,726,288 | Ellis | Dec. 6, 1955 |
| 2,844,217 | Klosner | July 22, 1958 |

FOREIGN PATENTS

| | | |
|---|---|---|
| 775,220 | France | Oct. 8, 1934 |